United States Patent
Inukai

(10) Patent No.: US 8,879,943 B2
(45) Date of Patent: Nov. 4, 2014

(54) POWER SUPPLY SYSTEM AND IMAGE FORMING APPARATUS

(71) Applicant: Brother Kogyo Kabushiki Kaisha, Nagoya (JP)

(72) Inventor: Katsumi Inukai, Ikwakura (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 115 days.

(21) Appl. No.: 13/626,804

(22) Filed: Sep. 25, 2012

(65) Prior Publication Data

US 2013/0164016 A1 Jun. 27, 2013

(30) Foreign Application Priority Data

Dec. 27, 2011 (JP) ................. 2011-286338

(51) Int. Cl.
*G03G 15/00* (2006.01)
*H02M 3/28* (2006.01)

(52) U.S. Cl.
USPC ............... 399/88; 307/39; 363/21.01; 399/37

(58) Field of Classification Search
USPC .......... 399/88, 37; 307/31, 38, 39, 82, 86, 87, 307/130; 363/16, 21.01, 21.07, 21.11, 363/21.15, 21.18
See application file for complete search history.

(56) References Cited

U.S. PATENT DOCUMENTS

| | | | |
|---|---|---|---|
| 5,834,857 A | 11/1998 | Abe et al. | |
| 5,914,538 A | 6/1999 | Kurosawa et al. | |
| 2012/0113685 A1 | 5/2012 | Inukai | |
| 2012/0114363 A1 | 5/2012 | Inukai | |
| 2012/0134190 A1* | 5/2012 | Lee et al. | 363/100 |

FOREIGN PATENT DOCUMENTS

| | | |
|---|---|---|
| JP | H07-087734 A | 3/1995 |
| JP | H07-298612 A | 11/1995 |
| JP | 2008-125184 A | 5/2008 |
| JP | 2012-105378 A | 5/2012 |
| JP | 2012-105379 A | 5/2012 |

\* cited by examiner

*Primary Examiner* — Sophia S Chen
(74) *Attorney, Agent, or Firm* — Merchant & Gould PC

(57) ABSTRACT

A power supply system for AC-DC conversion, includes: a first rectifying/smoothing circuit configured to rectify and smooth an AC voltage applied from an AC power supply; a switching power supply configured to perform voltage conversion on an output voltage of the first rectifying/smoothing circuit, and output the converted voltages; an accumulating unit configured to receive a charging current from the switching power supply; a detecting unit configured to detect input/cutoff of the AC power supply; and a control device configured to receive supply of electric power from the accumulating unit and stop the switching power supply if the detecting unit detects the cutoff of the AC power supply.

10 Claims, 9 Drawing Sheets

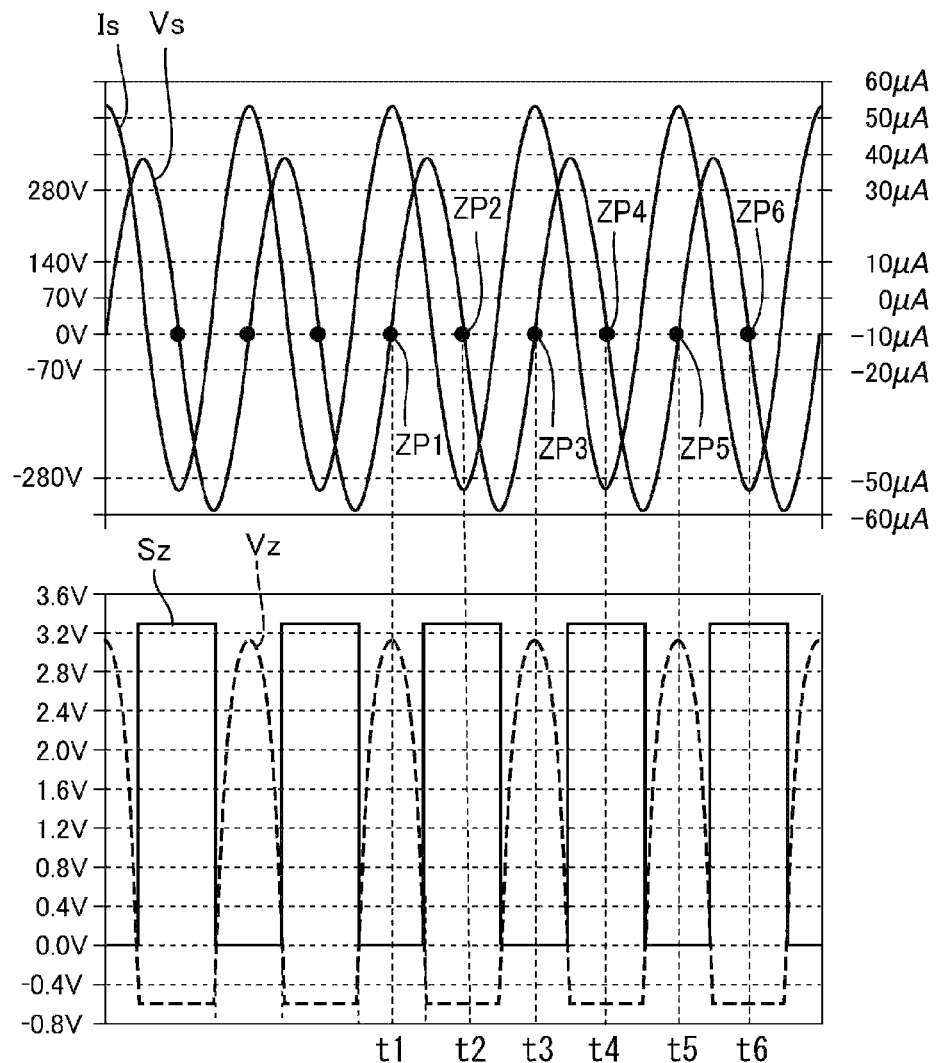

POWER SUPPLY SYSTEM AND IMAGE FORMING APPARATUS

CROSS-REFERENCE TO RELATED APPLICATION

This application is based upon and claims the benefit of priority of Japanese Patent Application No. 2011-286338 filed on Dec. 27, 2011 the contents of which are incorporated herein by reference in its entirety.

BACKGROUND

The present disclosure relates to a power supply system and an image forming apparatus having the power supply system.

A power supply system is known which has a switching power supply, and a main power-supply control unit for controlling the switching power supply.

SUMMARY

It couldn't be said that the switching power supply precisely follows the input/cutoff of an AC power supply, and it is feared that the switching power supply will malfunction. For example, during cutoff of the AC power supply, since discharge of a primary-side smoothing capacitor takes a while, it takes a while for the switching power supply to be turned off. For this reason, the followability may be degraded. Also, if a timing of the input of the AC power supply overlaps a timing when the main power-supply control unit activates the switching power supply, the switching power supply activated according to the input of the AC power supply may malfunction and stop.

One of aspects of the present disclosure was made on the basis of the above-mentioned circumferences, and an object is to provide a switching power supply which appropriately operates during input/cutoff of an AC power supply.

In this power supply system, after the AC power supply is turned off, it is possible to immediately stop the switching power supply, and thus the followability is excellent.

The aspects of the present disclosure provide the following arrangements:

A power supply system for AC-DC conversion, comprising:

a first rectifying/smoothing circuit configured to rectify and smooth an AC voltage applied from an AC power supply;

a switching power supply configured to perform voltage conversion on an output voltage of the first rectifying/smoothing circuit, and output the converted voltages;

an accumulating unit configured to receive a charging current from the switching power supply;

a detecting unit configured to detect input/cutoff of the AC power supply; and a control device configured to receive supply of electric power from the accumulating unit and stop the switching power supply if the detecting unit detects the cutoff of the AC power supply.

A power supply system for AC-DC conversion, comprising:

a first rectifying/smoothing circuit configured to rectify and smooth an AC voltage applied from an AC power supply;

a switching power supply configured to be activated according to an input of the AC power supply to perform voltage conversion on an output voltage of the first rectifying/smoothing circuit, and output the converted voltage;

a detecting unit configured to detect input/cutoff of the AC power supply;

an accumulating unit configured to receive a charging current from the switching power supply; and a control device configured to receive electric power from the accumulating unit during stop of the switching power supply, wherein if the detecting unit detects input of the AC power supply, the control device prohibits a control signal for switching an active state of the switching power supply from being output to the switching power supply for a predetermined period from the timing of the detection.

An image forming apparatus comprising:

a first rectifying/smoothing circuit configured to rectify and smooth an AC voltage applied from an AC power supply;

a switching power supply configured to perform voltage conversion on an output voltage of the first rectifying/smoothing circuit, and output the converted voltages;

an accumulating unit configured to receive a charging current from the switching power supply;

a detecting unit configured to detect input/cutoff of the AC power supply;

a control device configured to receive supply of electric power from the accumulating unit and stop the switching power supply if the detecting unit detects the cutoff of the AC power supply; and a printing unit configured to receive the electric power form the power supply system, to perform a printing process.

An image forming apparatus comprising:

a first rectifying/smoothing circuit configured to rectify and smooth an AC voltage applied from an AC power supply;

a switching power supply configured to be activated according to an input of the AC power supply to perform voltage conversion on an output voltage of the first rectifying/smoothing circuit, and output the converted voltage;

a detecting unit configured to detect input/cutoff of the AC power supply;

an accumulating unit configured to receive a charging current from the switching power supply;

a control device configured to receive electric power from the accumulating unit during stop of the switching power supply; and a printing unit configured to receive the electric power form the power supply system, to perform a printing process, wherein if the detecting unit detects input of the AC power supply, the control device prohibits a control signal for switching an active state of the switching power supply from being output to the switching power supply for a predetermined period from the timing of the detection.

An image forming apparatus comprising:

a first rectifying/smoothing circuit configured to rectify and smooth an AC voltage applied from an AC power supply;

a switching power supply configured to perform voltage conversion on an output voltage of the first rectifying/smoothing circuit, and output the converted voltages;

an accumulating unit configured to receive a charging current from the switching power supply;

a detecting unit configured to detect input/cutoff of the AC power supply;

a control device configured to receive supply of electric power from the accumulating unit and stop the switching power supply if the detecting unit detects the cutoff of the AC power supply;

a high-voltage-system component configured to receive a first output voltage as electric power from the switching power supply of the power supply system; and a low-voltage-system component configured to receive a second output voltage lower than the first output voltage from a voltage dropping circuit provided at an output stage of the switching power supply, and control the high-voltage-system component, wherein if the detecting unit detects the cutoff of the AC power supply, the control device performs a mode switching process of switching the switching power supply to a mode in which electric charge accumulated in the accumulating unit is consumed, and wherein the mode in which the electric charge accumulated in the accumulating unit is consumed is a mode in which electric power is supplied to at least the high-voltage-system component.

According to the aspects of the present disclosure, it is possible to provide a switching power supply which appropriately operates with respect to input/cutoff of an AC power supply.

BRIEF DESCRIPTION OF DRAWINGS

FIG. 4 is a view illustrating the relation between an output waveform of an AC power supply and a detection signal.

FIG. 5 is a view illustrating the ON/OFF sates of power supply systems in each mode.

DESCRIPTION OF EXEMPLARY EMBODIMENTS

First Embodiment

A first embodiment will be described with reference to FIGS. 1 to 10.

1. Description of Printer

Figure 1:
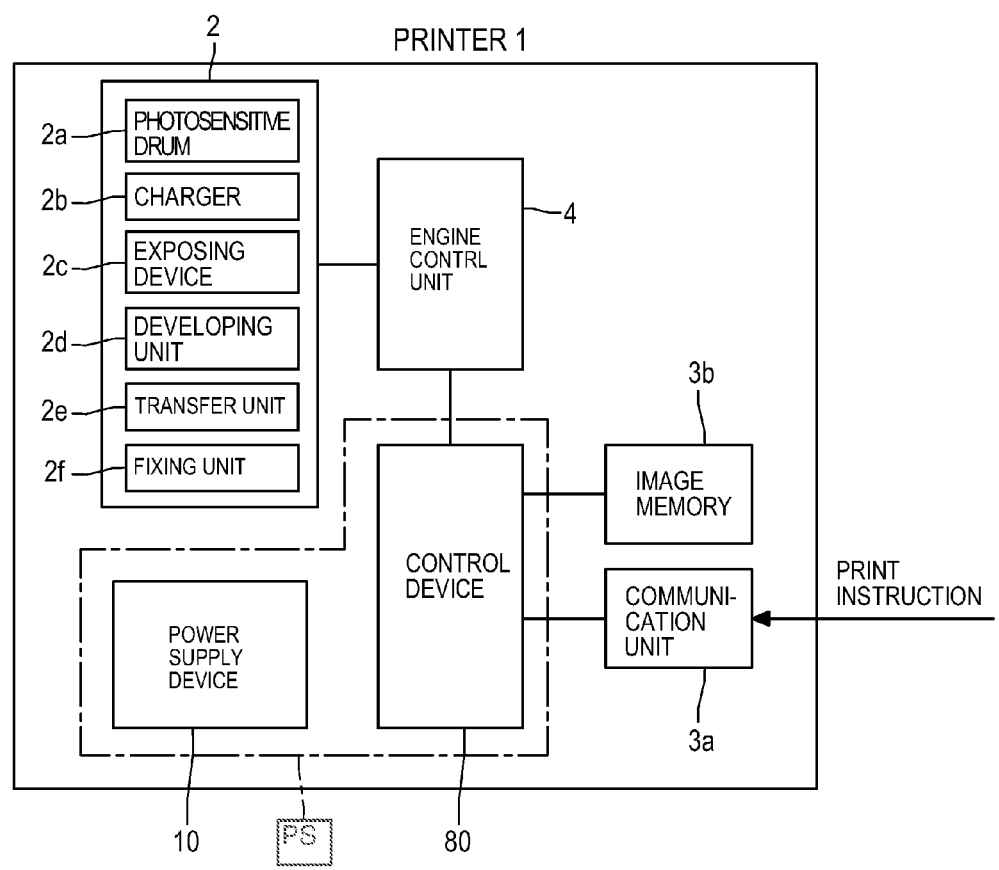
FIG. 1 is a block diagram illustrating the configuration of a printer according to a first embodiment.

FIG. 1 is a block diagram illustrating the electrical configuration of a printer (an example of an image forming apparatus) 1. The printer 1 includes a printing unit 2, an engine control unit 4 for controlling the printing unit 2, a communication unit 3a, an image memory 3b, a power supply device 10, and a control device 80. The power supply device 10 acts as a power supply for the printer 1, and supplies electric power to the printing unit 2, the engine control unit 4, the communication unit 3a, the image memory 3b, and the control device 80.

The printing unit 2 includes a photosensitive drum 2a, a charger 2b for performing a charging process of charging the surface of the photosensitive drum 2a, an exposing device 2c for performing an exposing process of forming an electrostatic latent image on the surface of the photosensitive drum 2a, a developing unit 2d for performing a developing process of attaching a developer to the electrostatic latent image formed on the surface of the photosensitive drum 2a such that a developer image is formed, a transfer unit 2e for performing a transfer process of transferring the developer image onto a recording medium, and a fixing unit 2f for performing a fixing process of fixing the developer image transferred on the recording medium.

The printing unit 2 performs a printing process of performing the charging process, the exposing process, the developing process, the transfer process, and the fixing process so as to print print data on a recording medium. The communication unit 3a performs communication with an information terminal device such as a PC, and has a function of receiving print instructions and print data from the information terminal device. The image memory 3b temporarily stores print data received from the information terminal device.

If the communication unit 3a receives a print instruction from the information terminal device and receives print data, in the printer 1, the control device 80 controls the printing unit 2 through the engine control unit 4 such that the printing unit 2 performs the printing process of performing the charging process, the exposing process, the developing process, the transfer process, and the fixing process so as to print print data on a recording medium. The operating voltage of the printing unit 2 is 24V (an example of a first output voltage), whereas the operating voltages of the communication unit 3a, the image memory 3b, the engine control unit 4, and the control device 80 are 3.3V (an example of a second output voltage). Also, the printing unit 2 is an example of a high-voltage-system component, and the engine control unit 4 and the control device 80 are examples of a low-voltage-system component.

2. Description of Circuit of Power Supply System

Now, a power supply system PS of the printer 1 will be described with reference to FIG. 2. The power supply system PS includes the power supply device 10, a zero-crossing detecting circuit 60, and the control device 80. First, the configuration of the power supply device 10 will be described below.

The power supply device 10 includes a rectifying/smoothing circuit 21 and a switching power supply 20. The rectifying/smoothing circuit 21 is a so-called capacitor input type, and is composed of a photodiode D1 for rectifying an AC voltage (240V) of an AC power supply 15, and a capacitor C1 for smoothing the rectified voltage.

The switching power supply 20 converts an output voltage of the rectifying/smoothing circuit 21 and outputs the converted voltages, and includes a transformer 23, a field effect transistor (FET) 25, a rectifying/smoothing circuit 27, a voltage detecting circuit 29, a control IC 50 for switching the FET 25, a DC to DC converter 35, a DC to DC converter 37, and a DC to DC converter 45. The rectifying/smoothing circuit 21 is an example of a first rectifying/smoothing circuit, the FET 25 is an example of a semiconductor switching device, and the control IC 50 is an example of a switch control unit. Also, the rectifying/smoothing circuit 27 is an example of a second rectifying/smoothing circuit.

The transformer 23 is provided on the output side of the rectifying/smoothing circuit 21, and is configured such that an input voltage Vin (about DC 322V) obtained by rectifying and smoothing the AC voltage is applied to a primary coil N1 of the transformer 23 through an input line Lin.

The FET 25 is an N-channel MOSFET, the drain D of the FET 25 is connected to the primary coil N1, and the source S of the FET 25 is grounded. The control IC 50 applies an ON/OFF signal (PWM signal) to the gate G of the FET 25 such that the FET 25 is turned on or off. Therefore, if the primary side of the transformer 23 oscillates, a voltage is induced at a secondary coil N2 of the transformer 23.

Also, on the primary side of the transformer 23, a voltage generating circuit 31 is provided. The voltage generating circuit 31 rectifies and smoothes a voltage induced at an auxiliary coil N3 provided on the primary side of the transformer 23 by a diode D2 and a capacitor C2. The voltage generating circuit 31 acts as a power supply (about DC 20V) of the control IC 50.

The rectifying/smoothing circuit 27 is provided on the secondary side of the transformer 23, and is composed of a diode D3 and the capacitor C3. The rectifying/smoothing circuit 27 rectifies and smoothes the voltage induced at the secondary coil N2 of the transformer 23. Therefore, the switching power supply 20 outputs a voltage of DC 24V through an output line Lo1. On the output line Lo1, a PNP transistor 33 acting as a load switch is provided. A control signal S1 is input to the base of the PNP transistor 33 such that the PNP transistor 33 is turn on or off, whereby the output line Lo1 is opened and closed.

Figure 2:
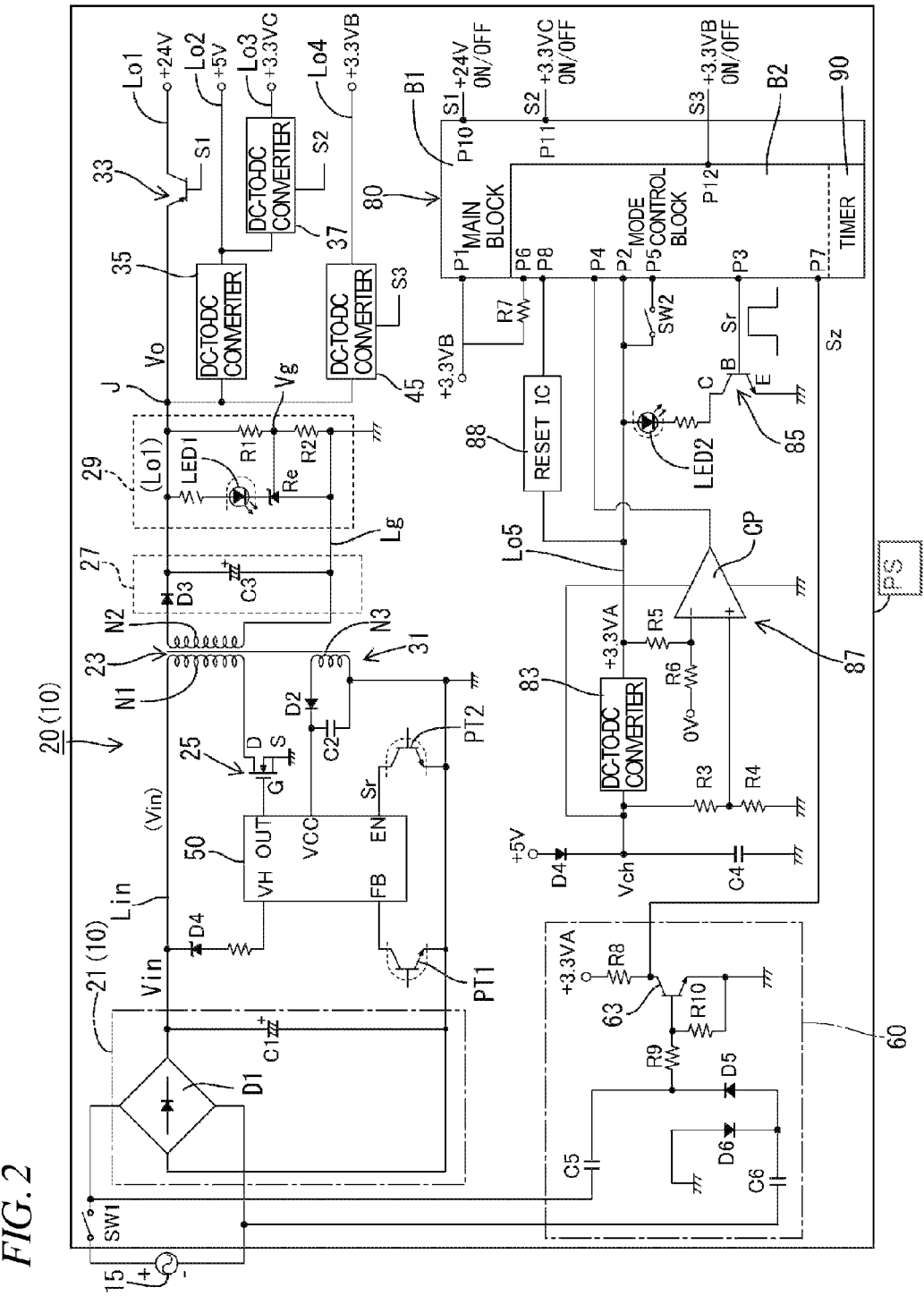
FIG. 2 is a circuit diagram illustrating the electrical configuration of a power supply system.

Also, as shown in FIG. 2, the output line Lo1 branches into three lines at a branch point J provided on the upstream side of the PNP transistor 33, and DC to DC converters 35 and 45 are provided on the branched lines, respectively. The DC to DC converter 35 converts the output voltage of the switching power supply 20 into 5V, and outputs 5V from an output line Lo2. Also, the output line Lo2 branches into two, and the DC to DC converter 37 is provided on the branched line. The DC to DC converter 37 drops the output voltage of the DC to DC converter 35 to 3.5V, and outputs 3.5V from an output line Lo3. Also, the DC to DC converter drops the output voltage of the switching power supply 20 to 3.3V, and outputs 3.3V from an output line Lo4. As described above, the switching power supply 20 outputs three voltages of 24V, 5V, and 3.3V.

24V supplied through the output line Lo1 mainly acts as a power supply for electric components constituting the printing unit 2. Also, 5V supplied through the output line Lo2 mainly acts as a power supply for charging a capacitor C4 to be described below. Further, 3.3V supplied through the output line Lo3 mainly acts as a power supply for the engine control unit 4 for controlling the printing unit 2. Also, 3.3V supplied through the output line Lo4 mainly acts as a power supply for the control device 80, the communication unit 3a, and the image memory 3b.

In order to distinguish the power supply systems of 3.3V, hereinafter, as shown in FIG. 2, 3.3V supplied through the output line Lo3 is referred to as 3.3 VC, and 3.3V supplied through the output line Lo4 is referred to as 3.3 VB. Also, in the present embodiment, in addition to the output lines Lo3 and Lo4, an output line Lo5 of a 3.3V system is provided, and 3.3V supplied through the output line Lo5 is referred to as 3.3 VA.

Between the rectifying/smoothing circuit 27 and the branch point J of the output line Lo1, the voltage detecting circuit 29 is provided. The voltage detecting circuit 29 is for detecting the output voltage Vo (DC 24V) of the switching power supply 20, and is composed of a pair of sensing resistors R1 and R2, a shunt regulator Re, and a light emitting diode LED 1 connected in series with the shunt regulator Re.

The sensing resistors R1 and R2 are provided between the output line Lo1 and a ground line Lg, and detects a divided voltage Vg obtained by dividing the output voltage Vo at a resistance ratio. In the shunt regulator Re, a current according to a level difference between the divided voltage Vg and a reference voltage in the shunt regulator Re flows. Therefore, a current flows in the light emitting diode LED 1, such that the light emitting diode LED 1 outputs a light signal of an amount of light according to the level difference between the divided voltage Vg and the reference voltage.

The light emitting diode LED1 constitutes a photocoupler, together with a phototransistor PT1 connected to a feedback port FB of the control IC 50. Therefore, the light signal of the light emitting diode LED1 is converted into an electric signal by the phototransistor PT1. A signal representing the level difference between the divided voltage Vg and the reference voltage of the shunt regulator Re (hereinafter, referred to as a feedback signal) is input (fed) to the feedback port FB of the control IC 50.

As shown in FIG. 2, the control IC 50 includes five ports, specifically, a power supply port VCC that is connected to the voltage generating circuit 31, a high-voltage input port VH that is connected to the input line Lin through a zener diode D4, the feedback port FB for receiving the feedback signal (a detection signal of the output voltage), an output port OUT that outputs the ON/OFF signal (PWM signal), and a control input port EN for receiving a control pulse signal Sr output from the control device 80.

The control IC 50 includes a comparator (not shown) and an oscillating circuit (not show) for oscillating a triangular wave. If the feedback signal is input to the feedback port FB, the control IC 50 generates a PWM signal according to the feedback signal, and outputs the PWM signal to the gate G of the FET 25 through the output port OUT. Therefore, the output voltage Vo of the switching power supply 20 is controlled such that the output voltage Vo becomes a target voltage.

Also, the control IC 50 has a function of stopping or restarting switching control (ON/OFF control) on the FET 25 on the basis of the control pulse signal Sr output from the control device 80.

The control device 80 includes a main block B1 for controlling the printing unit 2 of the printer 1 through engine control unit 4, and a mode control block B2 for mainly controlling the mode of the switching power supply 20.

A power supply port P1 of the main block B1 is connected to the output line Lo4 of the DC to DC converter 45, and receives the output voltage of 3.3 VB from the DC to DC converter 45.

The main block B1 includes two control ports P10 and P11. The control port P10 is connected to the base of the PNP transistor 33 provided on the output line Lo1, and the main block B1 outputs the control signal 51 through the control port P10 such that the PNP transistor 33 is switched to any one of an ON state and an OFF state.

The control port P11 is connected to the DC to DC converter 37 provided on the output line Lo3, and the main block B1 outputs a control signal S2 through the control port P11 such that the DC to DC converter 37 is switched to any one of a stop state and an active state.

Meanwhile, the mode control block B2 includes a control port P12. The control port P12 is connected to the PNP transistor 45 provided on the output line Lo4, and the mode control block B2 outputs a control signal S3 through the control port P12 such that the DC to DC converter 45 is switched to any one of a stop state and an active state.

Also, the power supply port P2 of the mode control block B2 is connected on the DC to DC converter (35) side, and receives power supply from the switching power supply 20 through the DC to DC converters 35 or 83. Specifically, to the output line Lo2 of the DC to DC converter 35, the capacitor (accumulating electric double layer capacitor) C4 is connected through the diode D4. The diode D4 is for preventing a backward flow from the capacitor C4 to the DC to DC converter (35) side. The capacitor C4 is an example of an accumulating unit.

Also, the output line Lo5 is drawn from the contact point of the capacitor C4 and the diode D4. On the output line Lo5, the DC to DC converter 83 is provided and is configured to drop the output voltage of the DC to DC converter 35 to 3.3V and apply 3.3V to the power supply port P2 of the mode control block B2. Therefore, during an output mode to be described below, the mode control block B2 receives power supply from the switching power supply 20 through the DC to DC converters 35 or 83.

Also, the capacitor C4 acts as a power supply for the mode control block B2 during an output stop mode in which the switching power supply 20 stops output, and is configured to receive a charging current from the DC to DC converter 35 through the output line Lo2.

The mode control block B2 further includes a control port P3. The control port P3 is connected to the base B of a transistor 85. The emitter E of the transistor 85 is grounded, and the collector C of the transistor 85 is connected to the cathode of a light emitting diode LED2.

The anode of the light emitting diode LED2 is connected to the output line Lo5. Also, the light emitting diode LED2 constitutes a photocoupler, together with a phototransistor PT2 connected to the control input port EN of the control IC 50. Therefore, if the control pulse signal Sr is output from the control port P3 of the mode control block B2 to the base of the transistor 85, the control pulse signal Sr is optically transmitted to the control input port EN of the control IC 50 through the photocoupler.

The mode control block B2 has a function of outputting the control pulse signal Sr to the control IC 50 such that the switching power supply 20 is switched between the output mode and the output stop mode. As will be described in detail, in addition to the output mode and the output stop mode, a consumption mode in which residual electric charge of the capacitors C1 and C3 is consumed during transition to the output stop mode is provided.

The output mode is a mode in which the primary side of the transformer 23 oscillates such that the switching power supply 20 becomes an output state (referred to as an active state). Also, the output stop mode is a mode in which the oscillation of the transformer 23 stops such that the output of the switching power supply 20 stops.

The control pulse signal Sr is set such that the control pulse signal Sr with the same pulse width is output during transition to the output mode and during transition to the output stop mode, without a distinction between a signal waveform for transition to the output mode and a signal waveform for transition to the output stop mode. In response to input of this control pulse signal Sr, the control IC 50 performs control such that the switching power supply 20 is switched between the output mode and the output stop mode (so-called toggle type switching).

As a method of switching the mode of the switching power supply 20, there are not only a method of alternately switching between modes in response to input of a pulse signal like in the present embodiment but also a method of outputting signals having levels according to modes, thereby performing mode switching. However, in the case of using the level signals, it is necessary to continuously output a high level signal in any one of the output mode and the output stop mode. Therefore, electric power is likely to be consumed. In view of this point, if a pulse signal is used to perform alternate switching between modes like in the present embodiment, it is possible to suppresses power consumption as compared to the case of using the level signals.

Also, the mode control block B2 includes a timer 90. The timer 90 is for measuring elapsed time from a timing of mode switching. This measurement of elapsed time is because of the following reason. In the output stop mode, the mode control block B2 receives electric power from the capacitor C4 so as to operate. Therefore, if the output stop mode continues for a long time, the charging voltage of the capacitor C4 is reduced, and thus it is difficult to maintain the output voltage of the DC to DC converter 83 at 3.3V. For this reason, it is necessary to use the timer 90 to measure time and switch the switching power supply 20 to the output mode such that the capacitor C4 is recharged before it becomes impossible to maintain the output voltage of the DC to DC converter 83 at 3.3V.

A detecting circuit 87 shown in FIG. 2 is for detecting the charging voltage Vch of the capacitor C4. The detecting circuit 87 includes sensing resistors R3 and R4 for detecting the charging voltage Vch of the capacitor C4, a comparator CP for comparing voltage values, detected by the sensing resistors R3 and R4, with a reference voltage, and outputting a comparison result, and a voltage dividing resistors R5 and R6 for the reference voltage.

The comparator CP outputs a high level signal to the port P4 of the mode control block B2 in a case where the charging voltage Vch is higher than the reference voltage, and outputs a low level signal to the port P4 in a case where the charging voltage Vch is lower than the reference voltage. Even in a case where the comparator CP outputs the low level signal, the mode control block B2 switches the switching power supply 20 to the output mode such that the capacitor C4 is recharged.

Also, the mode control block B2 includes a mode switch port P5, a check port P6, a detection port P7, and a reset port P8.

The mode switch port P5 is connected to a mode switching switch SW2. The mode switching switch SW2 is for enabling a user to instruct mode switching.

The check port P6 is connected to the output line Lo4 of 3.3 VB through a resistor R7. The voltage of the check port P6 can be detected to detect whether the switching power supply 20 is in an active state.

The detection port P7 is connected to a zero-crossing detecting circuit 60 through a signal line, and is configured to receive a detection signal Sz output from the zero-crossing detecting circuit 60. The mode control block B2 is configured to be capable of detecting whether the detection signal Sz is being input to the detection port P7, thereby detecting the input/cutoff of the AC power supply 15.

The zero-crossing detecting circuit 60 includes a pair of capacitors C5 and C6, a pair of diodes D5 and D6, and a NPN transistor 63.

As shown in FIG. 2, the cathode of the diode D5 is connected to one side (positive side) of the AC power supply 15 through the capacitor C5, and the anode of the diode D5 is connected to the other side (negative side) of the AC power supply 15 through the capacitor C6. In other words, the diode D5 is connected in parallel with the AC power supply 15 through the pair of capacitors C5 and C6.

The cathode of the diode D6 is connected to the anode of the diode D5, and the anode of the diode D6 is connected to a ground. The emitter of the NPN transistor 63 is connected to the ground, and is connected to a power supply line of 3.3VA through a resistor R8. Also, the base of the NPN transistor 63 is connected to the cathode of the diode D5 through a resistor R9. A resistor R10 is connected between the emitter and the base of the NPN transistor 63.

Figure 3:
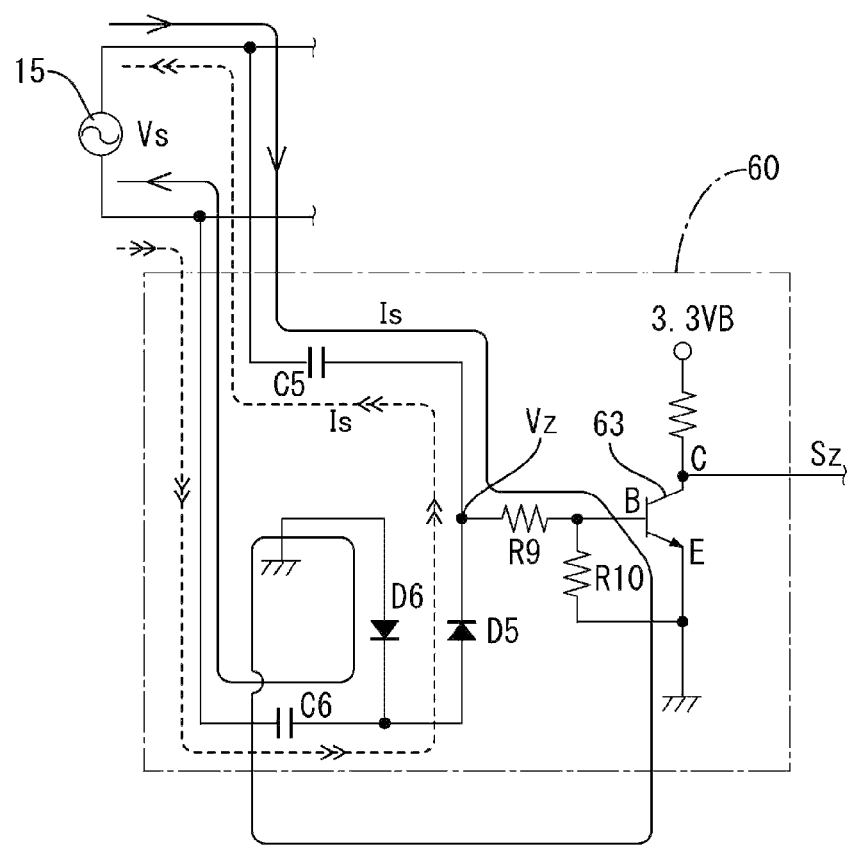
FIG. 3 is a view illustrating the circuit operation of a zero-crossing detecting circuit.

In the zero-crossing detecting circuit 60, in a positive half period in which the output voltage Vs of the AC power supply 15 is positive, as shown by a solid line in FIG. 3, a detection current Is flows along the course of the AC power supply 15, the capacitor C5, the resistor R9, the NPN transistor 63, the diode D6, and the capacitor C6. Meanwhile, in a negative half period in which the output voltage Vs of the AC power supply 15 is negative, as shown by an alternate long and short dash line in FIG. 3, the detection current Is flows along the course of the capacitor C6, the diode D5, and the capacitor C5. A voltage Vz, which is a voltage of a positive half period in which the output voltage Vs from the AC power supply 15 is positive by using the diodes D5 and D6, is applied to the base of the NPN transistor 63.

Therefore, the NPN transistor 63 becomes an ON state only in a period in which the detection current Is flows along the course shown by the solid line in FIG. 3, and in this period, the potential of the collector which is an output point is at a low level. Meanwhile, in a period in which the detection current Is flows along the course shown by the alternate long and short dash line in FIG. 3, the NPN transistor 63 becomes an OFF state, and in this period, the potential of the collector which is an output point is at a high level.

Therefore, the detection signal Sz output from the zero-crossing detecting circuit 60 becomes a pulse-like signal alternately repeating a high level and a low level according to the positive and negative output levels of the AC power supply 15, as shown in FIG. 4.

The phase of the detection signal Sz output from the zero-crossing detecting circuit 60 is earlier than the phase of the output voltage Vs of the AC power supply 15 by about 90 degrees. This is because the detection current Is passes through the capacitors C5 and C6 and thus the phase of the detection current Is becomes earlier with respect to the output voltage Vs of the AC power supply 15 by 90 degrees. Also, in order to detect the zero-crossings of the AC power supply 15 from the detection signal Sz, it is necessary only for the control device 80 to calculate timings corresponding to the middle points between the low level periods of the detection signal Sz (timings t1, t3, and t5 in FIG. 4) and timings corresponding to the middle points between the high level periods of the detection signal Sz (timings t2, t4, and t6 in FIG. 4). Theoretically, the obtained timings t1 to t6 correspond to the zero-crossings (ZP1 to ZP6 in FIG. 4) of the AC power supply 15.

In the present embodiment, the detection signal Sz output from the zero-crossing detecting circuit 60 is used for detecting the input/cutoff of the AC power supply 15, not for detecting the zero-crossings of the AC power supply 15. In other words, when the AC power supply 15 is in an applied state, the pulse-like detection signal Sz is output from the zero-crossing detecting circuit 60. Meanwhile, when the AC power supply 15 is in a cutoff state, the output of the zero-crossing detecting circuit 60 is hold at the high level. Therefore, if the detection port P7 of the mode control block B2 of the control device 80 is monitored to check the output of the zero-crossing detecting circuit 60, it is possible to detect whether the AC power supply 15 is in the applied state or in the cutoff state.

As the method of detecting the input/cutoff of the AC power supply 15, not only the method of using the zero-crossing detecting circuit 60 but also a method of using a current transformer for detection are technically possible. However, in the case of using a current transformer, the core of the transformer is slightly large, it is difficult to miniaturize the power supply device 10. In contrast, since the zero-crossing detecting circuit 60 is transformerless, there is an advantage that it is easy to miniaturize the power supply device 10.

3. Description of Mode of Switching Power Supply 20

As shown in FIG. 5, the switching power supply 20 has three patterns of the output mode, the output stop mode, and the consumption mode.

The output mode is a mode in which the primary side of the transformer 23 oscillates such that the switching power supply 20 becomes an output state. The output mode includes three modes, that is, a print mode, a preparation mode, and a sleep mode which are different from one another in the power consumption. The print mode is for performing printing, and is a mode in which all of the power supply systems of 24V, 5V, 3.3 VA, 3.3 VB, and 3.3 VC are set to the output state.

The preparation mode is a mode in which the power supply systems of 5V, 3.3 VA, 3.3 VB, and 3.3 VC other than the power supply system of 24V are set to the output state. The sleep mode is a mode in which the power supply systems of 5V and 3.3 VA other than the power supply system of 24V, 3.3 VB, and 3.3 VC are set to the output state. In the preparation mode and the sleep mode, since the power supply system of 24V is in the output stop state, it is possible to suppress the power supply of the switching power supply 20.

These three modes are switched in response to occurrence of an event such as an event where the communication unit 3a receives a print instruction, or an event where the user operates the mode switching switch SW2, and are also automatically switched on condition of the elapse of a set time period of the timer 90.

The output stop mode is a mode in which the oscillation of the transformer 23 stops such that the output of the switching power supply 20 stops. In the output stop mode, since the switching power supply 20 stops output, the power supply systems of 24V, 5V, 3.3 VB, and 3.3 VC stops, and only the power supply system of 3.3 VA becomes the output state.

The consumption mode is a mode in which the consumption of the residual electric charge of the capacitor C3 is hastened during the transition to the output stop mode. Like in the print mode, in the consumption mode, all of the power supply systems of 24V, 5V, 3.3 VA, 3.3 VB, and 3.3 VC are set to the output state. Also, unlike the print mode in which the switching power supply 20 is in the active state, in the consumption mode, the switching power supply 20 is in the stop state. This consumption mode is an example of 'a mode in which electric charge accumulated in the accumulating unit is consumed'.

4. Description of Operation of Power Supply System PS

<Output Stop Flow>

First, if a power switch SW1 is turned on, the input voltage Vin obtained by rectifying and smoothing the AC voltage of the AC power supply 15 is applied to the input line Lin of the switching power supply 20. As a result, electric power is supplied from the AC power supply (15) side to the control IC 50 through the high-voltage input port VH, whereby the control IC 50 is activated. The activated control IC 50 starts to output the ON/OFF signal (PWM signal) to the FET 25.

Then, the FET 25 starts an ON/OFF operation such that the primary side of the transformer 23 oscillates. As a result, the switching power supply 20 becomes the output state. If the switching power supply 20 becomes the output state, electric power is supplied to the main block B1 of the control device 80 through the output line Lo4, and electric power is supplied to the mode control block B2 of the control device 80 through the output line Lo5. Therefore, both of the main block B1 and the mode control block B2 are activated.

Figure 6:
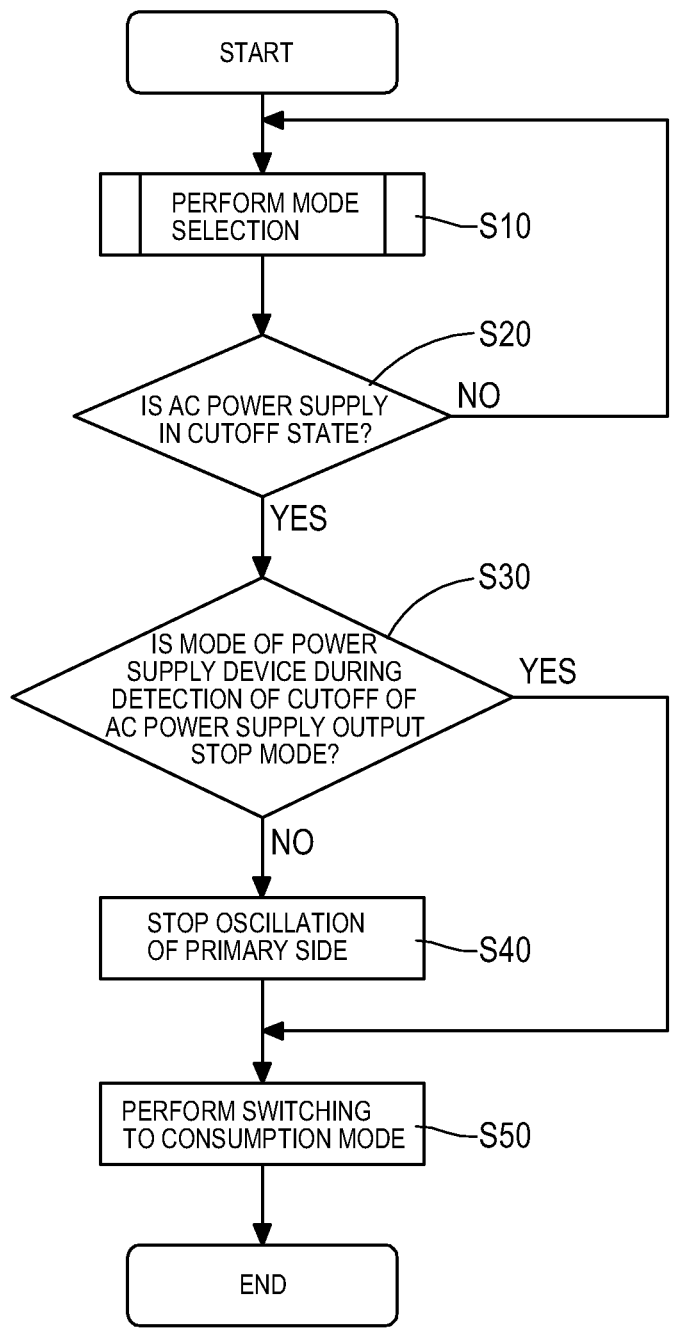
FIG. 6 is a flow chart illustrating an output stop flow.

After the activation, the control device 80 starts to perform an output stop flow of FIG. 6. First, in STEP S10, the mode control block B2 performs a mode selection process. In the mode selection process, as described above, in response to occurrence of an event such as an event where the communication unit 3a receives a print instruction, or an event where the user operates the mode switching switch SW2, a mode corresponding to the event is selected. Also, on condition of the elapse of the set time period of the timer 90, a mode corresponding to the condition is automatically selected.

Subsequently, in STEP S20, the mode control block B2 performs a process of determining whether the AC power supply 15 is in a cutoff state. Specifically, the mode control block B2 monitors the detection port P7 and checks whether the detection signal Sz is being output from the zero-crossing detecting circuit 60. In a case where the pulse-like detection signal Sz shown in FIG. 4 is being output from the zero-crossing detecting circuit 60, the mode control block B2 determines that the AC power supply 15 is in the applied state (NO in STEP S20). Meanwhile, in a case where the pulse-like detection signal Sz is not being output from the zero-crossing detecting circuit 60, the mode control block B2 determines that the AC power supply 15 is in the cutoff state (YES in STEP S20).

In the case where the AC power supply 15 is in the applied state (NO in STEP S20), the process proceeds to STEP S10 in which the mode control block B2 performs the mode selection process again. After the power switch SW1 is turned on, unless the user turns the power switch SW1 off or a power cord is pulled out by some chance, the AC power supply 15 maintains the applied state. Therefore, the mode control block B2 repeats the processes of STEPS S10 to S20, and thus it is possible to perform mode selection in response to an event while monitoring the detection signal Sz input to the detection port P7.

Also, after the power switch SW1 is turned on, if the AC power supply 15 is cut off, for example, if the user turns the power switch SW1 off, the output of the pulse-like detection signal Sz from the zero-crossing detecting circuit 60 stops. Therefore, in STEP S20, the mode control block B2 determines that the AC power supply 15 is in the cutoff state. In this case, the process proceeds to STEP S30. In STEP S30, the mode control block B2 determines whether the mode of the power supply device 10 during the detection of the cutoff of the AC power supply 15 is the output stop mode.

In a case where the mode of the power supply device 10 during the detection of the cutoff of the AC power supply 15 is not the output stop mode (NO in STEP S30), the process proceeds to STEP S40. In STEP S40, the mode control block B2 performs a process of stopping the oscillation of the primary side of the transformer 23 of the switching power supply 20. Specifically, the mode control block B2 outputs the control pulse signal Sr through the control port P3. The output control pulse signal Sr is optically transmitted to the control input port EN of the control IC 50 through the photocoupler. As a result, the control IC 50 stops the ON/OFF signal (PWM signal) from being output to the FET 25. Therefore, the FET 25 is turned off, the oscillation of the primary side of the transformer 23 stops, and the switching power supply 20 becomes the output stop state. A stopping process is implemented by the process of STEP S40 which is performed by the control device.

As described above, in the present embodiment, after the AC power supply is turned off, the control device immediately stops the oscillation of the primary side, such that the switching power supply 20 is forcedly stopped. Therefore, after the AC power supply is turned off, it is possible to stop the switching power supply 20 early. Accordingly, the followability is excellent.

Figure 7:
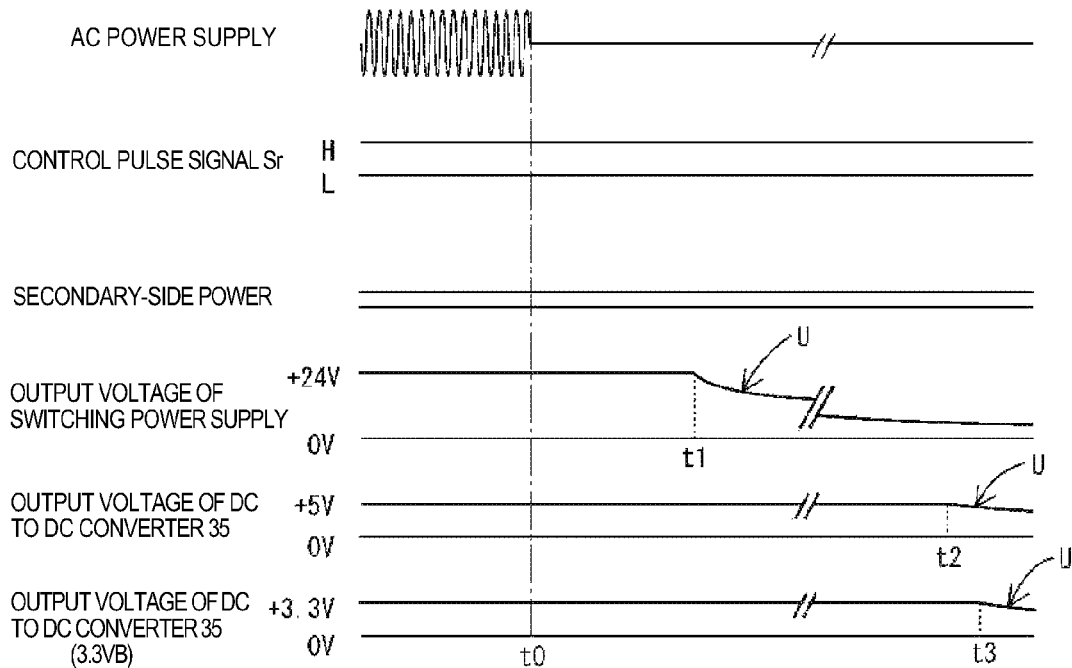
FIG. 7 is a view illustrating changes of the voltages of power supply systems during cutoff of an AC power supply according to a comparative example.
Figure 8:
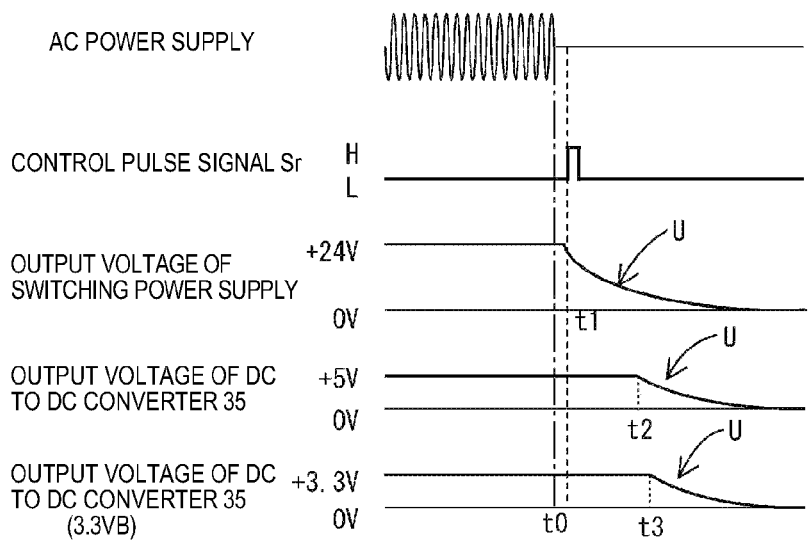
FIG. 8 is a view illustrating changes of the voltages of the power supply systems during cutoff of the AC power supply according to the embodiment.

Specifically, after the AC power supply is turned off, in a case where the switching power supply 20 is not forcedly stopped, in a period when the voltage of the smoothing capacitor C1 is maintained, since the control IC 50 operates, the switching power supply 20 is not turned off. Therefore, as shown in FIG. 7, a time period from a timing t0 when the AC power supply 15 is cut off to a timing t1, t2, or t3 when the output voltage of each power supply system starts to decrease is long. In contrast, in the present embodiment, after the AC power supply is turned off, since the switching power supply 20 is forcedly stopped. Therefore, as shown in FIG. 8, a time period from a timing t1 when the AC power supply 15 is cut off to a timing t1, t2, or t3 when the output voltage of each power supply system starts to decrease is short.

After the switching power supply 20 is forcedly stopped in STEP S40, the process proceeds to STEP S50. In STEP S50, the main block B1 and the mode control block B2 perform a process of switching the switching power supply 20 to the communication signal. In the consumption mode, control is performed such that the transformer 23 of the switching power supply 20 is in the stop state. Also, control is performed such that the PNP transistor 33 is in the ON state, and the DC to DC converter 35 and the DC to DC converter 45 are in the active state.

As a result, all of the output lines Lo1, Lo2, Lo3, Lo4, and Lo5 of the 24V system, the 5V system, the 3.3 VA system, the 3.3 VB system, and the 3.3 VC system become conductive, and thus electric power is consumed by electrical loads connected to the individual output lines. Therefore, it becomes possible to hasten the discharge of the capacitor C3 of the switching power supply 20. Particularly, since the electrical load of the 24V system is energized, the power consumption is large, and thus it is possible to particularly hasten the discharge of the capacitor C3.

In a case where the mode during the cutoff detection is the preparation mode or the sleep mode, if the mode during the detection of the cutoff is maintained even after the switching power supply 20 is cut off, the power consumption is small, and thus it is difficult for the capacitor C3 to be discharged. Therefore, as shown in FIG. 7, curves U when the voltages of the power supply systems decrease become gentle.

In contrast, in the present embodiment, after the transformer 23 of the switching power supply 20 is stopped, switching to the consumption mode is performed such that the power consumption is promoted as compared to the mode during the cutoff detection. Therefore, as shown in FIG. 8, curves U when the voltages of the power supply systems decrease become steep, and drops of the voltages are rapid. Therefore, the followability of the power supply device 10 relative to the cutoff of the AC power supply 15 is excellent. A function of a control device of performing a mode switching process of switching a switching power supply to a mode, in which electric charge accumulated in an accumulating unit is consumed, in a case where the detecting unit detects cutoff of an AC power supply is implemented by the process of STEP S50 which is performed by the control device 80.

If the process of STEP S50 is completed, the output stop flow is terminated. At the stage of terminating the output stop flow, only the power supply system of 3.3 VA using the capacitor C4 as a power supply becomes the output state, and the output voltages of the other power supply systems become 0V.

Meanwhile, in a case where the result of the determination STEP S30 is 'YES', that is, a case where the mode of the switching power supply 20 during the detection of the cutoff of the AC power supply 15 is the output stop mode, after STEP S30, the process skips the process of STEP S40 and proceeds to STEP S50. In STEP S50, the switching power supply 20 transitions to the consumption mode. Therefore, like in the case where the result of the determination STEP S30 is 'NO', the electric charge accumulated in the capacitor C3 is consumed by the electrical loads connected to the individual output lines. As a result, it becomes possible to hasten the discharge of the capacitor C3.

<Trouble in Case where Timing of Charging of Capacitor C4 Overlaps Timing of Input of AC Power Supply>

The mode control block B2 of the control device 80 uses the capacitor C4 as a power supply for backup during stop of the switching power supply. Therefore, if the charging voltage Vch of the capacitor C4 decreases, in order to charge the capacitor C4, mode control block B2 outputs the control pulse signal Sr, thereby performing control such that the switching power supply 20 is switched from the stop state to the active state. In other words, the mode control block B2 performs control such that the switching power supply 20 is switched from the output stop mode to the output mode.

In a case where the AC power supply 15 is in the applied state and the control IC 50 has stopped oscillation of the transformer 23, if receiving the control pulse signal Sr, the control IC 50 restarts the oscillation, and thus the switching power supply 20 is switched from the stop state to the active state. Then, the charging current is supplied to the capacitor C4 through the output line Lo2 such that the capacitor C4 is recharged.

However, in a case where the switching power supply 20 has stopped due to the cutoff of the AC power supply 15, since the control IC 50 is in the stop state, even if the control pulse signal Sr is output from the mode control block B2, the switching power supply 20 is not switched from the stop state to the active state.

Figure 9:
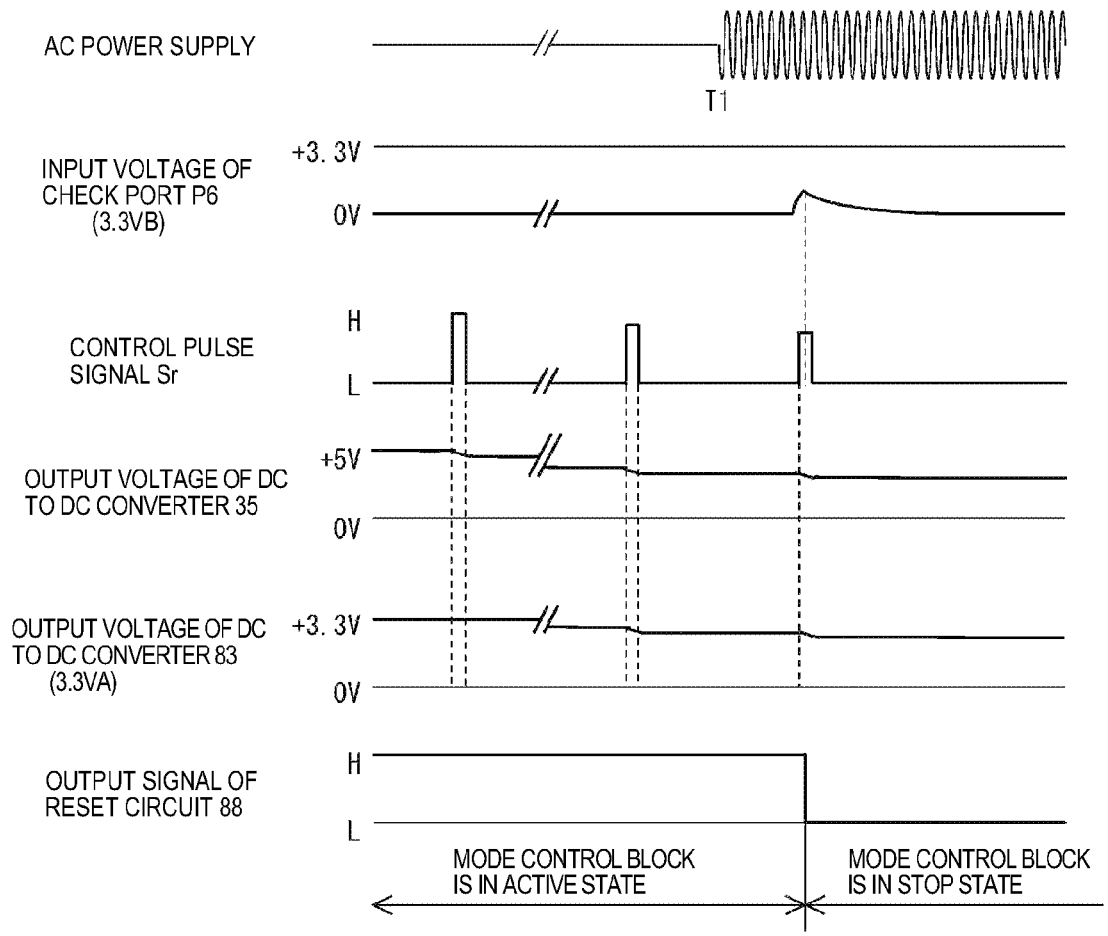
FIG. 9 is a view illustrating changes of the voltages of power supply systems during input of the AC power supply according to the comparative example.
Figure 10:
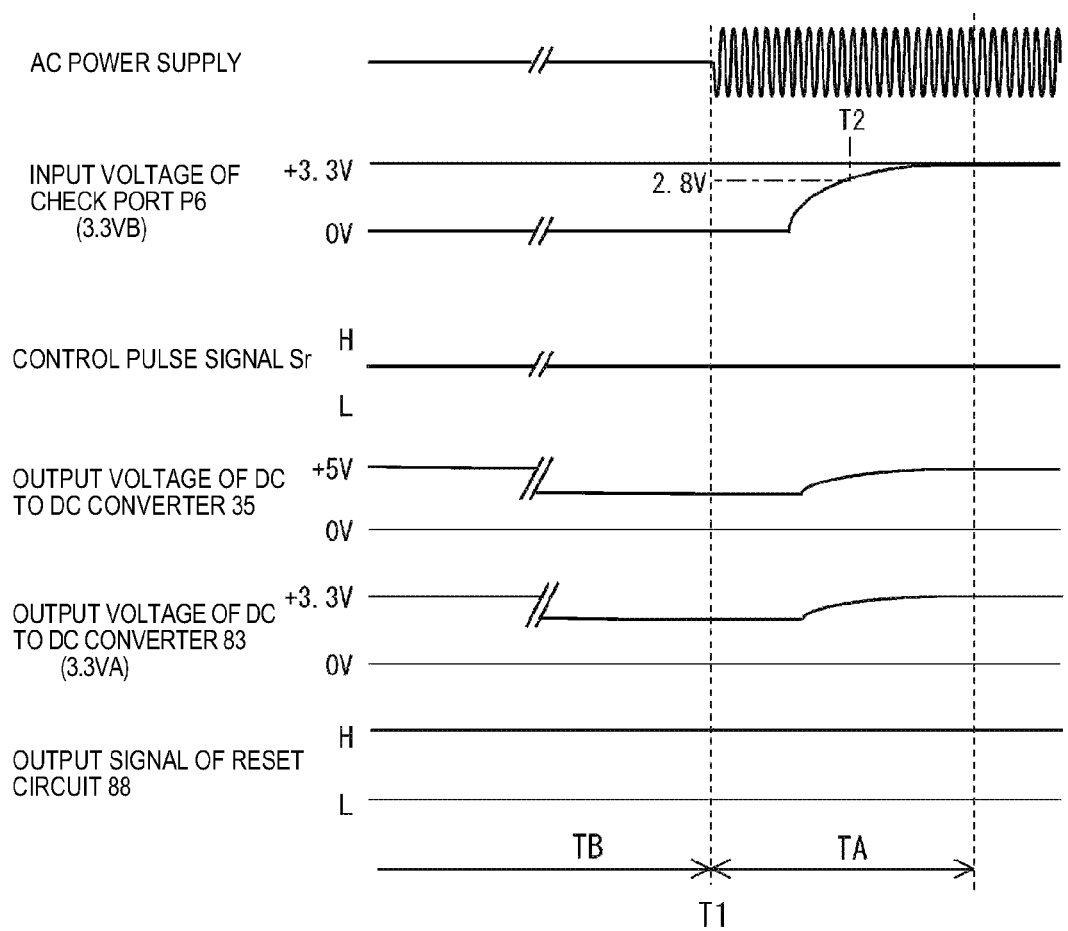
FIG. 10 is a view illustrating changes of the voltages of the power supply systems during input of the AC power supply according to the embodiment.
Figure 11:
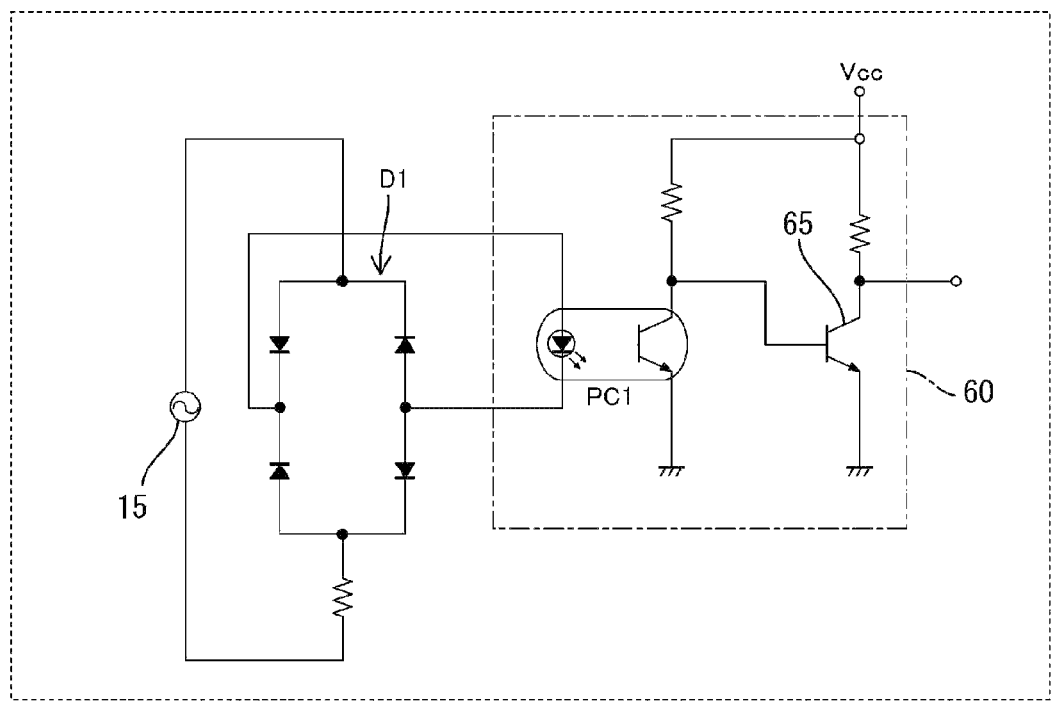
FIG. 11 is a view illustrating a modification of the zero-crossing detecting circuit.

In this case, the mode control block B2 repeatedly transmits the control pulse signal Sr as shown in FIG. 9. In a period when the transmission of the control pulse signal Sr is repeated, the discharge of the capacitor C4 progresses. Therefore, the charging voltage Vch and the output voltage of the DC to DC converter 83 decrease gradually.

Thereafter, if the AC power supply 15 is applied, electric power is supplied from the AC power supply 15 to the control IC 50 through the high-voltage input port VH, such that the control IC 50 is activated. The activated control IC 50 starts to output the ON/OFF signal (PWM signal) to the FET 25, and thus the switching power supply 20 is switched to the active state, regardless of the control pulse signal Sr. Therefore, the voltage of the secondary side of the switching power supply 20, that is, the voltage of each power supply system increases.

Meanwhile, since the mode control block B2 includes the check port P6, if the voltage of the switching power supply 20 rises, the voltage of the check port P6 exceeds a predetermined value (for example, 2.8V), and thus it is possible to confirm the activation of the switching power supply 20. However, there is a time lag from when the AC power supply 15 is applied (T1 in FIG. 9) to when the voltage of the check port P6 exceeds the predetermined value due to a rise in the voltage of the switching power supply 20, and in this period, if the control pulse signal Sr is output from the mode control block B2 to the control IC 50, in response to the control pulse signal Sr, the control IC 50 erroneously stops the switching power supply 20 activated by the input of the AC power supply 15.

Meanwhile, since the charging voltage Vch of the capacitor C4 continuously decreases, if the output voltage of the DC to DC converter 83 decreases to a level lower than the operating voltage of the mode control block B2, a reset IC 88 operates (outputs an active low reset signal) so as to stop the mode control block B2. In this case, unless the reset IC 88 releases the reset of the mode control block B2, the mode control block B2 is not activated again.

Therefore, the switching power supply 20 is maintained at the stop state, and in this case, unless the power switch SW1 is turned on again, the switching power supply 20 maintains the stop state.

In order to prevent this trouble, in the present embodiment, the mode control block B2 detects whether there is input of the AC power supply 15, on the basis of the detection signal Sz output from the zero-crossing detecting circuit 60. In a case of detecting the input of the AC power supply 15, for a predetermined period (TA in FIG. 10) from the timing T1 of the detection of the input of the AC power supply 15, the mode control block B2 prohibits the control pulse signal Sr from being output to the control IC 50 of the switching power supply 20. In this way, it is possible to prevent the mode control block B2 from erroneously stop the switching power supply 20 activated by the input of the AC power supply 15. A function of the control device of prohibiting a control signal (the control pulse signal Sr) for switching an active state of the switching power supply from being output to the switching power supply before a predetermined period elapses from the timing of the detection, in a case where the detecting unit detects input of the AC power supply is implemented.

Also, it is preferable to set the length of the predetermined period TA when the output of the control pulse signal Sr is prohibited to a period longer than at least a recognition period from the timing of the detection of the input of the AC power supply 15 to when the control device 80 recognizes the activation of the switching power supply 20. For example, in a case of an example of FIG. 10, it is preferable to set the length of the predetermined period TA to a period longer than at least a time period (T2−T1) from the timing T1 of the detection of the input of the AC power supply 15 to the timing T2 when the voltage of the check port P6 exceeds 2.8V which is the predetermined value, that is, the timing T2 when the control device 80 recognizes the activation of the switching power supply 20. In this case, it is preferable to prohibit the output of the control pulse signal Sr on condition of the detection of the input of the AC power supply 15 and to release the prohibition after the timing T2 when the voltage of the check port P6 exceeds the predetermined value. In a case where the control device (80) side can recognize the activation of the switching power supply 20, since malfunction does not occur, if the output of the control pulse signal Sr is prohibited at least for the predetermined period, it is possible to almost securely suppress malfunction. Also, in the example of FIG. 10, the prohibition period was provided after the timing T2 when the voltage of the check port P6 exceeds the predetermined value, and the predetermined period TA was set to be long.

Also, not only in the predetermined period after the timing T1 of the detection of the input of the AC power supply 15, but also in a period where the cutoff of the AC power supply 15 is being detected (TB in FIG. 10), it is preferable that the control pulse signal Sr is not output from the mode control block B2 to the control IC 50. This is because in the case where the AC power supply 15 is in the cutoff state, even if the control pulse signal Sr is output, since the switching power supply 20 cannot be activated, the output of the control signal is wasted.

<Other Embodiments>

The present invention is not limited to the embodiments described with reference to the drawings, but, for example, the following embodiments are included in the technical scope of the present invention.

(1) In the above-mentioned embodiment, the power supply system PS is applied to a printer. However, the present invention is not limited thereto. The power supply system PS can be applied to any other electric apparatuses. For example, the power supply system PS can be widely used for home appliances such as TV sets and video players. Also, in the above-mentioned embodiment, the printer may be an electrophotographic printer or an inkjet printer.

(2) In the above-mentioned embodiment, the zero-crossing detecting circuit has been described as an example of the detecting unit for detecting the input/cutoff of the AC power supply 15. However, any other components capable of detecting the input/cutoff of the AC power supply 15 can be used. For example, the zero-crossing detecting circuit can be replaced with a current transformer. Also, in a case of using a zero-crossing detecting circuit, not only the circuit exemplified in the above-mentioned embodiment, but also a circuit using a photocoupler PC1 and a common-emitter transformer 65 can be used.

(3) In the above-mentioned embodiment, the FET (field effect transistor) has been exemplified as a semiconductor switching device for switching the transformer 23. However, a bipolar transistor may be used.

(4) In the above-mentioned embodiment, the capacitor C4 has been described as an example of the accumulating unit. However, instead of the capacitor, a secondary battery or a battery may be mounted.

(5) In the above-mentioned embodiment, when the power supply device 10 is stopped according to the detection of the cutoff of the AC power supply 15, transition to the consumption mode is performed. However, the transition to the consumption mode is not necessarily needed. During the detection of the cutoff of the AC power supply 15, it is needed only to stop at least the switching power supply 20.

What is claimed is:

1. A power supply system for AC-DC conversion, comprising:
    a first rectifying/smoothing circuit configured to rectify and smooth an AC power supplied from an AC power supply, and configured to supply a first DC power having a first voltage;
    a switching power supply configured to convert the first DC power having the first voltage received from the first rectifying/smoothing circuit to a second DC power having a second voltage, and configured to supply the second DC power;
    an accumulating unit configured to accumulate the second DC power supplied from the switching power supply;
    a detecting unit configured to detect input/cutoff of the AC power supply; and
    a control device configured to, in case that the detecting unit detects the cutoff of the AC power supply while the switching power supply is supplying the second voltage, control the switching power supply to stop supplying the second DC power.

2. The power supply system according to claim 1, wherein the detecting unit includes a zero-crossing detecting circuit.

3. The power supply system according to claim 1, wherein the switching power supply includes:
    a transformer including a primary coil and a secondary coil;
    a semiconductor switching device connected to the primary coil of the transformer; a switch control unit configured to control the semiconductor switching device; and a second rectifying/smoothing circuit provided on the secondary coil of the transformer, and the control device outputs a control signal to the switch control unit to turn off the semiconductor switching device to stop the switching power supply.

4. The power supply system according to claim 1, further comprising a DC-DC converter coupled to the switching power supply and the accumulating unit;
    wherein in a case that the detecting unit detects the cutoff of the AC power supply, the control device controls the DC-DC converter to consume the power accumulated in the accumulating unit.

5. An image forming apparatus comprising: the power supply system according to claim 4;
    a high-voltage-system component configured to receive a first output voltage as electric power from the switching power supply of the power supply system; and
    a low-voltage-system component configured to receive a second output voltage lower than the first output voltage from a voltage dropping circuit provided at an output stage of the switching power supply, and control the high-voltage-system component,
    wherein the mode in which the electric charge accumulated in the accumulating unit is consumed is a mode in which electric power is supplied to at least the high-voltage-system component.

6. An image forming apparatus comprising: the power supply system according to claim 1; and
    a printing unit configured to receive the electric power form the power supply system, to perform a printing process.

7. A power supply system for AC-DC conversion, comprising:
    a first rectifying/smoothing circuit configured to rectify and smooth an AC voltage applied from an AC power supply;
    a switching power supply configured to be activated according to an input of the AC power supply to perform voltage conversion on an output voltage of the first rectifying/smoothing circuit, and output the converted voltage;
    a detecting unit configured to detect input/cutoff of the AC power supply;
    an accumulating unit configured to receive a charging current from the switching power supply; and
    a control device configured to receive electric power from the accumulating unit during stop of the switching power supply,
    wherein if the detecting unit detects input of the AC power supply, the control device prohibits a control signal for switching an active state of the switching power supply from being output to the switching power supply for a predetermined period from the timing of the detection.

8. The power supply system according to claim 7, wherein the predetermined period is longer than at least a recognition period from the timing of the input of the AC power supply to when the control device recognizes the activation of the switching power supply.

9. The power supply system according to claim 7, wherein in a period when cutoff of the AC power supply is being detected by the detecting unit, the control device prohibits the control signal for switching the active state of the switching power supply from being output to the switching power supply.

10. An image forming apparatus comprising:
    the power supply system according to claim 7; and
    a printing unit configured to receive the electric power form the power supply system, to perform a printing process.

* * * * *